G. C. JENSEN.
TRANSMISSION COVER LOCK.
APPLICATION FILED JUNE 25, 1919.
1,385,553.
Patented July 26, 1921.
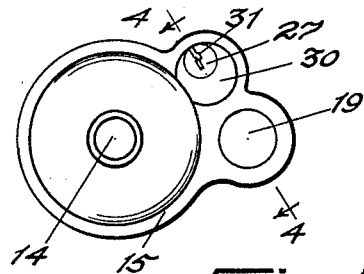
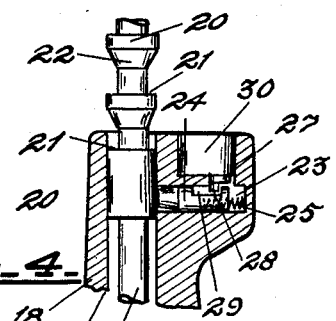
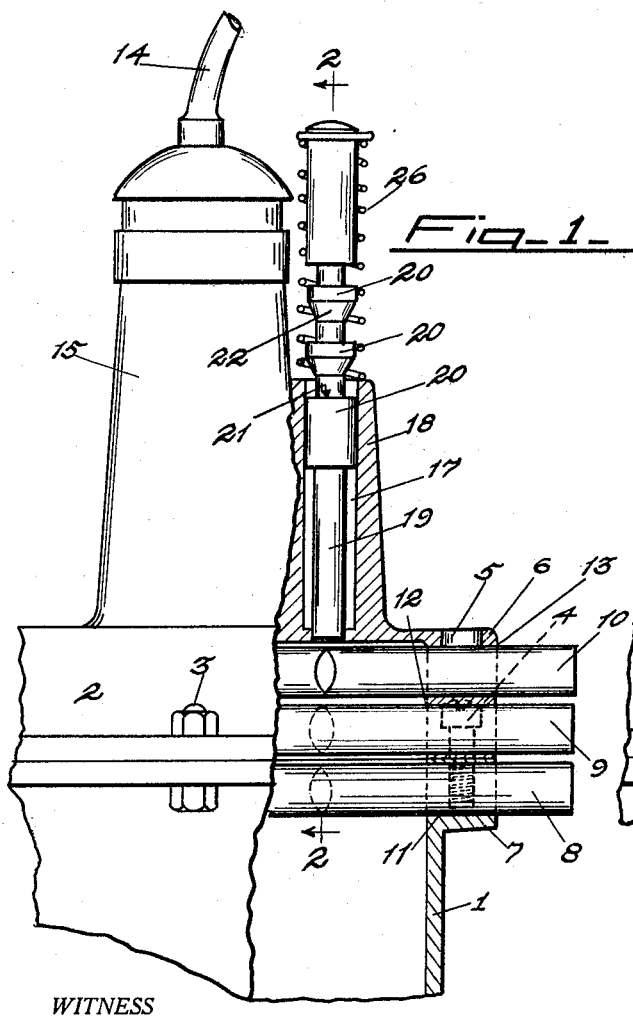
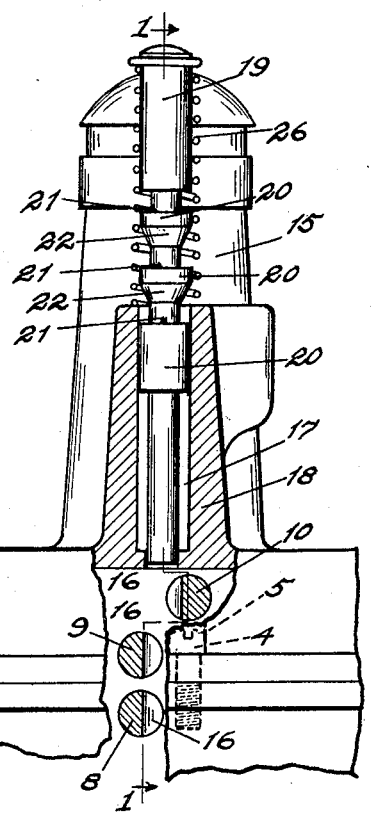
WITNESS
INVENTOR
BY George C. Jensen
ATTORNEYS

UNITED STATES PATENT OFFICE.

GEORGE C. JENSEN, OF OAKLAND, CALIFORNIA.

TRANSMISSION-COVER LOCK.

1,385,553.   Specification of Letters Patent.   Patented July 26, 1921.

Original application filed August 8, 1918, Serial No. 248,868. Divided and this application filed June 25, 1919. Serial No. 306,699.

*To all whom it may concern:*

Be it known that I, GEORGE C. JENSEN, a citizen of the United States, residing at Oakland, in the county of Alameda and State of California, have invented certain new and useful Improvements in Transmission-Cover Locks, of which the following is a specification.

The present invention is a divisional application of that Serial Number 248868, filed August 8, 1918, and the same has for its objects to provide a simple construction which is capable of operation to prevent operative movement of one or more of the shifting devices of a vehicle gear shift or transmission, and wherein the locking of one of the shifting devices prevents the removal of the cover from the transmission case, preferably by precluding the release of the means for normally holding the cover to the case.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention reference is directed to the accompanying drawings, wherein—

Figure 1 is a view in broken side elevation of the preferred embodiment of my invention, taken on line 1—1 of Fig. 2.

Fig. 2 is a vertical transverse sectional view taken on line 2—2 of Fig. 1.

Fig. 3 is a view in top plan.

Fig. 4 is a sectional view taken on line 4—4 of Fig. 3.

Referring more particularly to the several views of the drawings, wherein like characters of reference designate corresponding parts,—1 indicates a transmission case within which are positioned the variable speed power transmitting gears or devices of any well known type. The case is adapted to be closed by a removable cover 2 secured to the case proper by bolts 3 and by a set screw 4 insertible through an opening 5 in the flange 6 of the cover and receivable in the flange 7 of the case.

The gear shifting devices in the present illustration are in the form of longitudinally movable rods 8, 9 and 10, arranged parallel to each other, the rods 8 and 9 being in vertical alinement, and the rod 10 being slightly offset therefrom, as in Fig. 2 of the drawings. The rod 8 is slidable at one end in a guide opening 11 formed in the flange 7 of the case 1. The rod 9 is slidable at one end in an opening 12 formed in the flange 6 of the cover 2, and the rod 10, at one end, is slidable in an opening 13 in the flange 6 of the cover 2, which opening intersects the recess 5 at a point above the head of the screw 4 when the same is in its set position. The shifting devices or rods 8, 9 and 10 are adapted for selective operation by a suitable shift lever 14, of any well known type, fulcrumed in the upper end of a tubular support 15 projecting upwardly from the cover 2. The shifting devices or rods 8, 9 and 10 are provided in corresponding faces with recesses 16 which are adapted to lie in vertical alinement, as in Fig. 1, when the shifting rods or devices are moved to position the transmission elements in neutral position.

The cover is provided with a vertical bore 17 surrounded by a guide 18, said bore being in alinement with the recesses 16 of the shift devices, and within the bore is mounted for longitudinal movement a locking bolt 19 adapted on the depression thereof to have its lower end received successively in the recesses 16 of the shift devices 10, 9 and 8. The bolt is of such length as to project at its upper end beyond the upper end of the guide 18 and is formed with the spaced annular projections 20 arranged a distance from each other equal to the distance between the shifting devices 10, 9 and 8. Each of the projections has a substantially flat upper face 21, and the two upper projections are provided with beveled underfaces 22.

The guide 18 is provided at its upper end with a bore 23 communicating at one end with the bore 17 adjacent its upper end, and longitudinally movable within said bore 23 is a latch 24 outwardly pressed by a spring 25, and adapted, on the manual depression of the bolt 19 against the tension of its releasing spring 26, to successively project over the upper flat surface 21 of the respective projections 20 and thus lock the bolt 19 from upward movement as the lower end of the same is successively received in the notches 16 of the shift rods or devices 10, 9 and 8.

The latch 24 is adapted to be retracted to disengage the outer end thereof from the projection 20 by any suitable lock controlled structure, that illustrated being in the form of a rotating barrel 27, the lower end of which is provided with an offset 28 projecting into a recess 29 in the latch 24, the barrel being received in a tubular casing 30 and adapted to be rotated on the insertion of a controlling key in the key-way 31.

It will be apparent that when the shifter rod or device 10 is locked from movement, the end of the same overlies the head of the screw 4 and thus prevents the removal of the screw to prevent the detachment of the cover 2 from the gear case 1.

It is also apparent that the bolt 19, as the lower end of the same is successively received in the notches 16 of the shift devices 10, 9 and 8, is locked in its various stages of depression, and when it is desired to restrict the operation of the vehicle under its power certain shift devices may be locked and others may be free for operative movement.

It will also be apparent that on the depression of the bolt 19, the same is automatically locked from upward movement by the latch 24, until such time as the barrel 27 is rotated by its controlling key to retract said latch 24.

While I have illustrated the screw 4 as passing downwardly through the cover into the case wall and preclude the removal of the same by the positioning thereover of the shift rod in the cover, it is to be understood that any suitable form of mechanism may be employed for normally holding the cover to the case and which is precluded from detachment by one of the shifter devices concealing or preventing access to be had thereto, or in any manner precluding the withdrawal of the securing means from the parts which it attaches.

Having thus described my invention what I claim as new and desire to protect by Letters Patent is:—

1. In combination with a vehicle transmission having a case member and a removable cover member therefor, a bolt for detachably securing the members together, a shifter device movable within one of said members and capable of movement to prevent the release of said bolt, and means for locking said shifter device from movement when the same is in a position to prevent the release of said cover securing bolt.

2. In combination with a vehicle transmission having a case and removable cover therefor, a bolt passing through the cover and having threaded connection with the case for detachably securing the cover and case together, a shifter device carried by and operative within the cover, said device capable of positioning to overlie said cover securing bolt to prevent the removal thereof from its set position, and means for locking said shifter device from movement when in its latter position.

3. In combination with a vehicle transmission having a case and a removable cover therefor, a shifter rod within the cover and operating at one end through an opening in the cover end wall, said cover end wall provided with an opening intersecting said shifter rod receiving opening, a bolt passing through said latter opening and engaging said case for detachably securing the case and cover together, said shifter device adapted for positioning to prevent access to said bolt, and lock controlled means for locking said shifter device in its latter position.

4. In combination with a vehicle transmission having a flanged case member and a flanged removable cover member therefor, means passing through the flanges of the cover and case for detachably securing the cover and case together, a shifter device movable within one of said members and capable of movement to prevent the release of said securing means, and means for locking said shifter device from movement when the same is in a position to prevent the release of said cover securing means.

In testimony whereof I have signed my name to this specification in the presence of two subscribing witnesses.

GEORGE C. JENSEN.

Witnesses:
HARRY A. TOTTEN,
D. B. RICHARDS.